US011080225B2

United States Patent
Borikar et al.

(10) Patent No.: US 11,080,225 B2
(45) Date of Patent: Aug. 3, 2021

(54) PEER DIRECT MECHANISM FOR DIRECT MEMORY ACCESS ACROSS HOST DEVICES

(71) Applicant: Cisco Technology, Inc., San Jose, CA (US)

(72) Inventors: Sagar Borikar, San Jose, CA (US); Anant Thakar, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/356,581

(22) Filed: Mar. 18, 2019

(65) Prior Publication Data

US 2020/0301873 A1 Sep. 24, 2020

(51) Int. Cl.
*G06F 15/173* (2006.01)
*G06F 13/12* (2006.01)
*G06F 13/40* (2006.01)
*G06F 13/28* (2006.01)

(52) U.S. Cl.
CPC ...... *G06F 15/17331* (2013.01); *G06F 13/128* (2013.01); *G06F 13/28* (2013.01); *G06F 13/404* (2013.01)

(58) Field of Classification Search
CPC .............................. G06F 9/455; G06F 15/173
See application file for complete search history.

(56) References Cited

U.S. PATENT DOCUMENTS

| 9,483,290 | B1* | 11/2016 | Mantri | G06F 9/45558 |
| 2002/0184330 | A1* | 12/2002 | Wilson | G06F 15/17 709/213 |
| 2005/0175011 | A1* | 8/2005 | Yoshida | H04L 47/10 370/392 |
| 2007/0101016 | A1* | 5/2007 | Boyd | G06F 15/17 709/238 |
| 2009/0276551 | A1* | 11/2009 | Brown | G06F 13/102 710/72 |

(Continued)

OTHER PUBLICATIONS

NVIDIA Corporation, "NVIDIA DGX-2 The World's Most Powerful Deep Learning System for the Most Complex AI Challenges", Nov. 2018, 2 pages.

(Continued)

*Primary Examiner* — Getente A Yimer
(74) *Attorney, Agent, or Firm* — Edell, Shapiro & Finnan, LLC (57) ABSTRACT

In one example, at least one peripheral interconnect switch obtains, from a first endpoint device, a message initiating a direct memory access data transfer between the first endpoint device and a second endpoint device. The message indicates an address assigned to the second endpoint device by a host device as a destination of the message. Based on the address assigned to the second endpoint device by the host device, the at least one peripheral interconnect switch identifies an address assigned to the second endpoint device by the at least one peripheral interconnect switch. In response to identifying the address assigned to the second endpoint device by the at least one peripheral interconnect switch, the at least one peripheral interconnect switch provides the message to the second endpoint device.

20 Claims, 8 Drawing Sheets

(56) References Cited

U.S. PATENT DOCUMENTS

2012/0126851 A1* 5/2012 Kelem .................. G06F 9/3897
326/38
2018/0254981 A1* 9/2018 Babu .................. H04L 61/2592

OTHER PUBLICATIONS

Paul Brown, (/Users/BRO66), Linux Kernel 4.19—Long Term Support, USB Type C, and WiFi 6, October 23, 2018, 3 pages.
Richard Solomon, "PCI Express® Basics & Background", PCIeTechnology Seminar, www.pcisig.com, downloaded Feb. 28, 2019, 45 pages.
Jack Regula, "Using Non-transparent Bridging in PCI Express Systems", PLX Technology, Inc., Jun. 1, 2004, 31 pages.
Wikipedia, "Direct memory access", https://en.wikipedia.org/wiki/Direct_memory_access, Feb. 15, 2019, 8 pages.
John Franco, "What is Direct Memory Access (DMA) and Why Should We Know About it?", downloaded Feb. 18, 2019, 23 pages.
David, "An overview of direct memory access", The Infinite Loop, https://geidav.wordpress.com/2014/04/27/an-overview-of-direct-memory-access/, Apr. 27, 2014, 7 pages.

* cited by examiner

PEER DIRECT MECHANISM FOR DIRECT MEMORY ACCESS ACROSS HOST DEVICES

TECHNICAL FIELD

The present disclosure relates to Direct Memory Access (DMA).

BACKGROUND

In today's data centers, Central Processing Unit (CPU) development is lagging behind workload requirements. As such, endpoint devices are bottlenecked by CPUs and perform sub-optimally. Data centers use highly optimized and efficient workloads with low latency to cater to High Performance Computing (HPC) or Artificial Intelligence (AI) ecosystems. CPU involvement in data movement always incurs latency, causing an overall reduction in throughput and underutilization of the Input/Output (I/O) bandwidth. Direct Memory Access (DMA), which is a mechanism to transfer data from one entity/device to another, was developed to address such latency issues.

Peripheral Component Interconnect express (PCIe) is a standard for connecting high-speed endpoint devices to host devices, and is often implemented in data centers. PCIe systems can utilize one or more Non-Transparent Bridges (NTBs). A NTB hides an endpoint device from a host device by terminating PCIe configuration requests at the bridge level and presenting itself as the endpoint device to the host device. Thus, a NTB can hide the PCIe topology completely from the host device ecosystem and selectively present the endpoint device as configured by a user. This allows masking of endpoint device implementation from the host device and virtualization of the Base Address Register (BAR) corresponding to the endpoint device presented to the host device.

DESCRIPTION OF EXAMPLE EMBODIMENTS

Overview

In one example embodiment, at least one peripheral interconnect switch is connected to a first host device, a second host device, a first endpoint device, and a second endpoint device. The first host device hosts the first endpoint device, and the second host device hosts the second endpoint device. The at least one peripheral interconnect switch obtains, from the first endpoint device, a message initiating a direct memory access data transfer between the first endpoint device and the second endpoint device. The message indicates an address assigned to the second endpoint device by the second host device as a destination of the message. Based on the address assigned to the second endpoint device by the second host device, the at least one peripheral interconnect switch identifies an address assigned to the second endpoint device by the at least one peripheral interconnect switch. In response to identifying the address assigned to the second endpoint device by the at least one peripheral interconnect switch, the at least one peripheral interconnect switch provides the message to the second endpoint device.

EXAMPLE EMBODIMENTS

Figure 1:
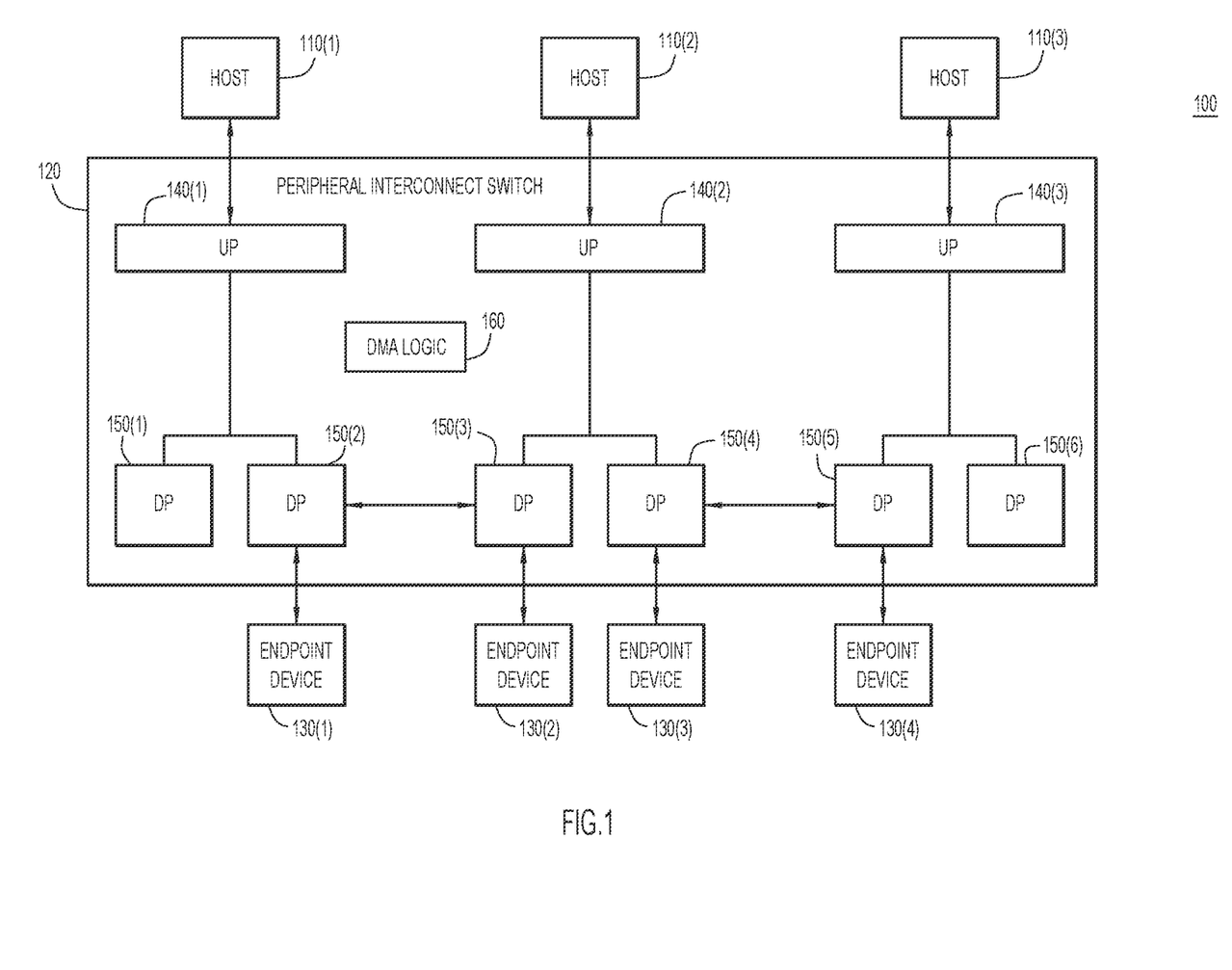
FIG. 1 is a diagram of a system configured to implement a peer direct mechanism for Direct Memory Access (DMA) across host devices, according to an example embodiment.

FIG. 1 is an example system 100 configured to implement a peer direct mechanism for Direct Memory Access (DMA) across host devices. System 100 includes host devices 110(1)-110(3), peripheral interconnect switch 120, and endpoint devices 130(1)-130(4). Host devices 110(1)-110(3) may be servers (e.g., host servers) with the same or different root complexes. Peripheral interconnect switch 120 may be a Peripheral Component Interconnect express (PCIe) switch configured to connect to endpoint devices 130(1)-130(4). Example of endpoint devices 130(1)-130(4) may include one or more Graphics Processing Units (GPUs), Non-Volatile Memory express (NVMe), Redundant Array of Independent Disks (RAID) controllers, etc.

Peripheral interconnect switch 120 includes upstream ports (UP) 140(1)-140(3) and downstream ports (DP) 150(1)-150(6). Host device 110(1) connects to upstream port 140(1), host device 110(2) connects to upstream port 140(2), and host device 110(3) connects to upstream port 140(3). Upstream port 140(1) connects to downstream ports 150(1) and 150(2). Upstream port 140(2) connects to downstream ports 150(3) and 150(4). Upstream port 140(3) connects to downstream ports 150(5) and 150(6). Downstream port 150(2) connects to downstream port 150(3), and downstream port 150(4) connects to downstream port 150(5). Downstream port 150(2) connects to endpoint device 130(1), downstream port 150(3) connects to endpoint device 130(2), downstream port 150(4) connects to endpoint device 130(3), and downstream port 150(5) connects to endpoint device 130(4). In this example, host device 110(1) hosts endpoint device 130(1). For example, endpoint device 130(1) may be mapped to host device 110(1) during initial configuration. Similarly, host device 110(2) hosts endpoint devices 130(2) and 130(3), and host device 110(3) hosts endpoint device 130(4).

Initially, peripheral interconnect switch 120 is powered up, and assigns addresses to endpoint devices 130(1)-130(4). For example, peripheral interconnect switch 120 may assign address "1234" to endpoint device 130(1), "2345" to endpoint device 130(2), etc. Next, host devices 110(1)-110(3) are powered up and assign respective addresses to endpoint devices 130(1)-130(3). For example, host device 110(1) assigns address "abcd" to endpoint device 130(1), host device 110(2) assigns address "aabbccdd" to endpoint device 130(2), etc. Thus, there are four address domains in system 100. The first address domain comprises the address assigned to endpoint device 130(1) by host device 110(1) (i.e., "abcd"). The second address domain comprises the address assigned to endpoint devices 130(2) and 130(3) by host device 110(2). The third address domain comprises the address assigned to endpoint device 130(4) by host device 110(3). The fourth address domain is a homogeneous address space that comprises the addresses assigned to endpoint devices 130(1)-130(4) by peripheral interconnect switch 120 (i.e., "1234," "2345," etc.).

Peripheral interconnect switch 120 utilizes a Non-Transparent Bridge (NTB) to isolate and manage these different address domains. A NTB allows mapping of a single endpoint device to different host devices through a predetermined configuration. With assistance from a management CPU on a PCIe switch, the NTB may be configured to use a direct offset mechanism and/or Look-Up Tables (LUTs) to map endpoints devices and host devices. A NTB also provides flexibility to remap the address domains from one address domain to another address domain based on the configuration. For example, if a first host device has carved out address regions for a given device, and a second host device wants to access that device, the switch management CPU may change the LUT Ternary Content-Addressable Memory (TCAM) to refer to the second host address and PCIe domain. This may be achieved with the assistance of the PCIe switch CPU and the NTB driver running in the host device(s).

In the example of system 100, endpoint devices 130(1)-130(4) are only aware of the addresses assigned by peripheral interconnect switch 120, and host devices 110(1)-110(3) are only aware of the addresses assigned by host devices 110(1)-110(3). Peripheral interconnect switch 120 is aware of both sets of addresses, and performs address translation between the addresses assigned by host devices 110(1)-110(3) and the addresses assigned by peripheral interconnect switch 120 based on a mapping between the address domains. An Application Specific Integrated Circuit (ASIC) of peripheral interconnect switch 120 may configure the mapping of the address domains in CAM, for example. The mapping may be stored in LUTs of upstream ports 140(1)-140(3).

Consider an example in which host device 110(1) sends a message to endpoint device 130(1). When upstream port 140(1) receives the message, peripheral interconnect switch 120 determines that the message identifies address "abcd." The LUT associated with upstream port 140(1) lists "abcd" (i.e., the host-assigned address) as a source address and "1234" (i.e., the switch-assigned address) as the destination address. As such, peripheral interconnect switch 120 sends the message to endpoint device 130(1) through downstream port 150(2).

Traditional peer direct mechanisms for DMA operate using host-assigned addresses and, as such, only allow DMA between endpoint devices that are behind the same root complex on a single host device. If a switch-assigned address is used, the peer direct mechanisms for DMA fail. Thus, DMA is precluded for endpoint devices that are behind different root complexes on different host devices. This means that data transfer for such endpoint devices typically requires host device resources, such as the host device CPU, to facilitate data transfer.

Traditional peer direct mechanisms for DMA also have drawbacks even for devices behind the same root complex on a single host device. For example, the Input/Output (I/O) Memory Management Unit (IOMMU) allows translation between switch-assigned addresses and host-assigned addresses. Because peer direct mechanisms for DMA use host-assigned addresses, this translation precludes the operation of peer direct mechanisms for DMA. Therefore, the IOMMU must be disabled or configured in pass-through mode in order to successfully transfer data using traditional peer direct mechanisms for DMA.

There are also security concerns with traditional peer direct mechanisms for DMA. Access Control Services (ACS) is a PCIe capability that places security restrictions on which devices can communicate with others without the host device CPU. To enable data transfer using traditional peer direct mechanisms for DMA, ACS must be disabled, which places the devices at a security risk. Furthermore, traditional peer direct mechanisms for DMA are vendor-specific, and are therefore unsuitable for widespread, standardized implementation.

Accordingly, in order to enable peer direct mechanisms for DMA across host devices, and to address other drawbacks in traditional peer direct mechanisms for DMA, DMA logic 160 is provided in peripheral interconnect switch 120. DMA logic 160 causes peripheral interconnect switch 120 to perform one or more operations described herein. In one example, DMA logic 160 enables peer direct mechanisms for DMA between endpoint device 130(1) (hosted by host device 110(1)) and endpoint device 130(2) (hosted by host device 110(2)).

Briefly, peripheral interconnect switch 120 obtains, from endpoint device 130(1), a message initiating a DMA data transfer between endpoint device 130(1) and endpoint device 130(2). The message indicates address "aabbccdd" (i.e., the address assigned to endpoint device 130(2) by host device 110(2)) as the destination of the message. Based on address "aabbccdd", peripheral interconnect switch 120 identifies address "2345" (i.e., the address assigned to endpoint device 130(2) by peripheral interconnect switch 120). In response to identifying address "2345," peripheral interconnect switch 120 provides the message to endpoint device 130(2).

Thus, the techniques described herein enable DMA data transfer between endpoint device 130(1) and endpoint device 130(2) (i.e., across host devices 110(1) and 110(2)). In addition, the IOMMU is not utilized for downstream transactions targeted from endpoint device 130(1) to endpoint device 130(2), and therefore the IOMMU need not be disabled or configured in pass-through mode. These techniques also avoid dependency on the ACS internal to peripheral interconnect switch 120, as the management CPU in peripheral interconnect switch 120 gives full control of the ACS to the user. Furthermore, the operations described herein may be vendor-agnostic.

Figure 2:
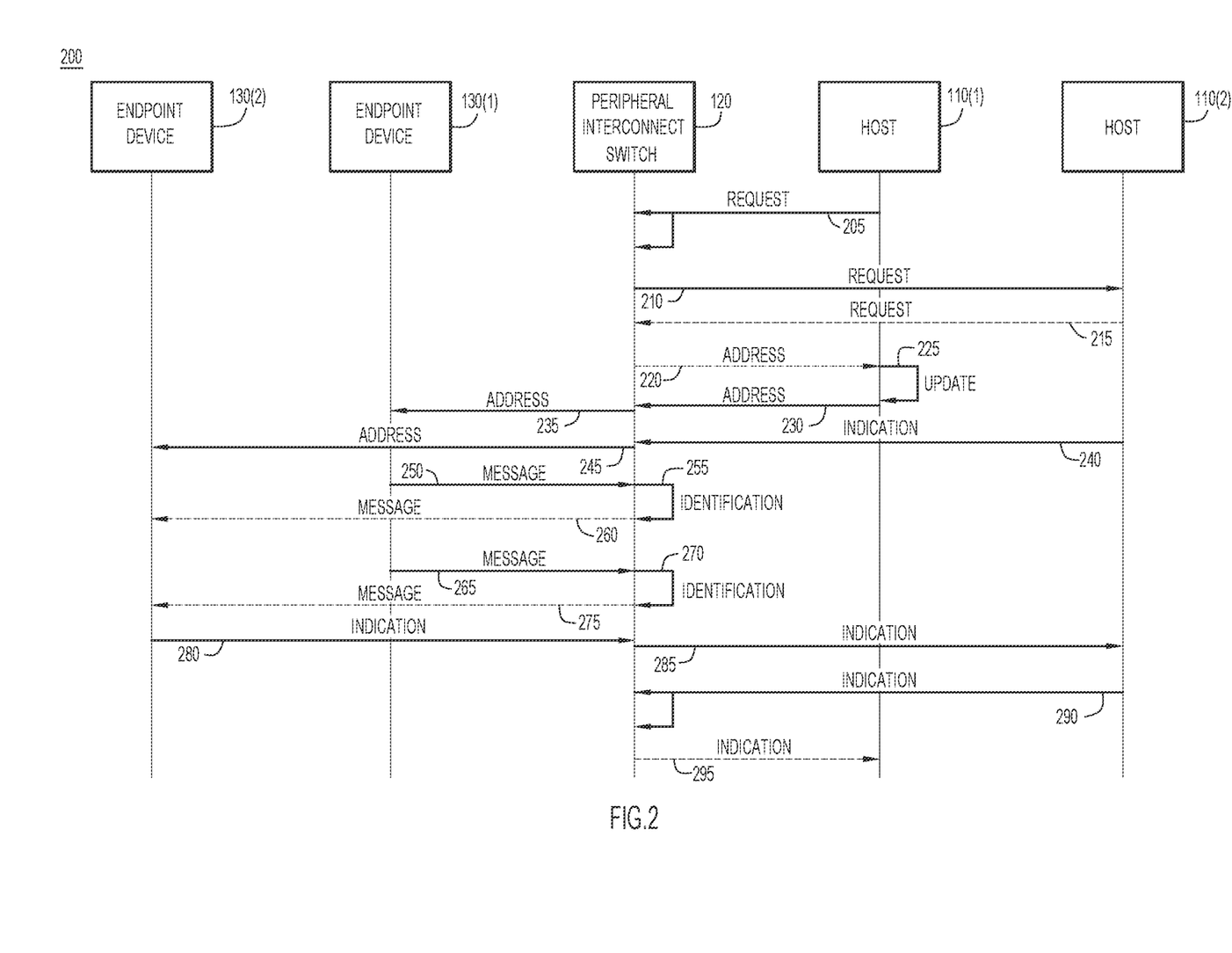
FIG. 2 is a call flow for implementing a peer direct mechanism for DMA across host devices, according to an example embodiment.

FIG. 2 is an example call flow for implementing a peer direct process 200 for DMA across host devices. Reference is made to FIG. 1 for the purposes of describing FIG. 2. The peer direct process 200 occurs between endpoint devices 130(1) and 130(2), peripheral interconnect switch 120, and host devices 110(1) and 110(2). At 205, peripheral interconnect switch 120 obtains, from host device 110(1), a request to initiate a DMA data transfer between endpoint devices 130(1) and 130(2). The request may be provided via a control message window by a device driver for endpoint device 130(1) running in host device 110(1) through any suitable pre-defined protocol. At 210, peripheral interconnect switch 120 provides the request to the host device 110(2). Peripheral interconnect switch 120 may route the request as a NTB message. At 215, peripheral interconnect switch 120 obtains, from host device 110(2), address "aabbccdd" (i.e., the address assigned to endpoint device 130(2) by host device 110(2)). The address "aabbccdd" may be indicated using the Base Address Register (BAR) address location of endpoint device 130(2).

At 220, peripheral interconnect switch 120 provides (e.g., forwards) address "aabbccdd" to host device 110(1). At 225, host device 110(1) stores address "aabbccdd" in local memory. Peripheral interconnect switch 120 may also store address "aabbccdd" in the LUT of upstream port 140(1). For example, host device 110(1) may configure the LUT of upstream port 140(1) using the CPU of peripheral interconnect switch 120 to trap all upstream transactions initiated from endpoint device 130(1) that hit the LUT. Similarly, the device driver running in host device 110(2) may configure upstream port 140(2) with appropriate entries that enable the peer transfer. Host device 110(1) may also request the bus, device, and function (the switch domain identity) and store the bus, device, and function in the configuration table of upstream port 140(1).

At 230, peripheral interconnect switch 120 obtains address "aabbccdd" from host device 110(1). At 235, peripheral interconnect switch 120 provides address "aabbccdd" to endpoint device 130(1). Peripheral interconnect switch 120 may configure descriptors in endpoint device 130(1) that point to the BAR address of location of endpoint device 130(2), as provided by host device 110(1). At 240, peripheral interconnect switch 120 obtains, from host device 110(2), a command to provide an indication when the DMA data transfer is complete. For example, the command may cause endpoint device 130(2) to update the completion queue entry to point to the memory location of host device 110(2). At 245, peripheral interconnect switch 120 provides the command to endpoint device 130(2).

At 250, peripheral interconnect switch 120 obtains, from endpoint device 130(1), a message initiating the DMA data transfer between endpoint devices 130(1) and 130(2). The message indicates address "aabbccdd" as the destination of the message. At 255, based on address "aabbccdd," peripheral interconnect switch 120 identifies address "2345" (i.e., the address assigned to endpoint device 130(2) by peripheral interconnect switch 120). For example, peripheral interconnect switch 120 may determine that a LUT entry at upstream port 140(1) is hit for the BAR address of endpoint device 130(2) (e.g., address "aabbccdd"), which corresponds to address "2345." At 260, in response to identifying address "2345," peripheral interconnect switch 120 provides (e.g., routes) the message to endpoint device 130(2).

In one example, endpoint device 130(2) may provide a response to peripheral interconnect switch 120 which is forwarded to upstream port 140(2). Instead of forwarding the response to host device 110(2), peripheral interconnect switch 120 traps the response in the LUT of upstream port 140(2) and forwards the response to upstream port 140(1). Upstream port 140(1) then provides the response to endpoint device 130(1). Thus, peer-to-peer communication is achieved using DMA logic 160 implemented in peripheral interconnect switch 120.

At 265, peripheral interconnect switch 120 obtains, from endpoint device 130(1), another message that indicates address "aabbccdd" as the destination of the message and initiates another DMA data transfer between endpoint devices 130(1) and 130(2). Messages 250 and 260 may be part of the same DMA data transfer process (e.g., both initiated in response to request 205). At 270, based on address "aabbccdd," peripheral interconnect switch 120 identifies address "2345." At 275, in response to identifying address "2345," peripheral interconnect switch 120 provides the message to endpoint device 130(2). At 280, peripheral interconnect switch 120 obtains, from endpoint device 130(2), the indication that the DMA data transfer is complete. At 285, peripheral interconnect switch 120 provides the indication to host device 110(2). At 290, peripheral interconnect switch 120 obtains the indication from host device 110(2). At 295, peripheral interconnect switch 120 provides the indication to host device 110(1).

Figure 3:
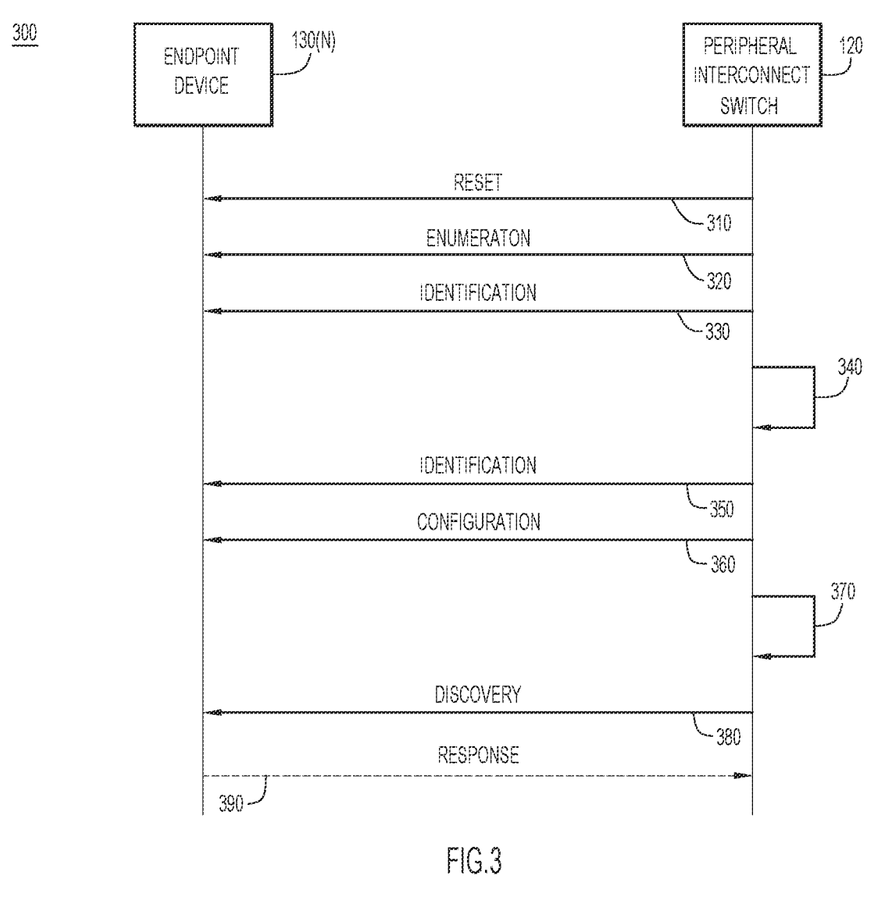
FIG. 3 is a call flow for initial configuration of an endpoint device, according to an example embodiment.

FIG. 3 is an example call flow for a process 300 to perform an initial configuration of endpoint device 130(N). Reference is made to FIG. 1 for the purposes of describing FIG. 3. Endpoint device 130(N) may be one or more of endpoint device 130(1)-130(4)). Process 300 may occur before process 200 shown in FIG. 2. At 310, peripheral interconnect switch 120 resets endpoint device 130(1) to discover any connected resources. At 320, peripheral interconnect switch 120 performs an endpoint device enumeration process. At 330, peripheral interconnect switch 120 identifies the endpoint device configuration space. At 340, peripheral interconnect switch 120 updates LUT entries for configuration space access. At 350, peripheral interconnect switch 120 identifies the BAR resource space. At 360, peripheral interconnect switch 120 configures the BARs with the switch address space. At 370, peripheral interconnect switch 120 configures/updates LUT entries with BAR resource addresses from switch address space. At 380, peripheral interconnect switch 120 continues performing device discovery for other capabilities. At 390, endpoint device 130(N) responds to discovery requests from peripheral interconnect switch 120.

Figure 4:
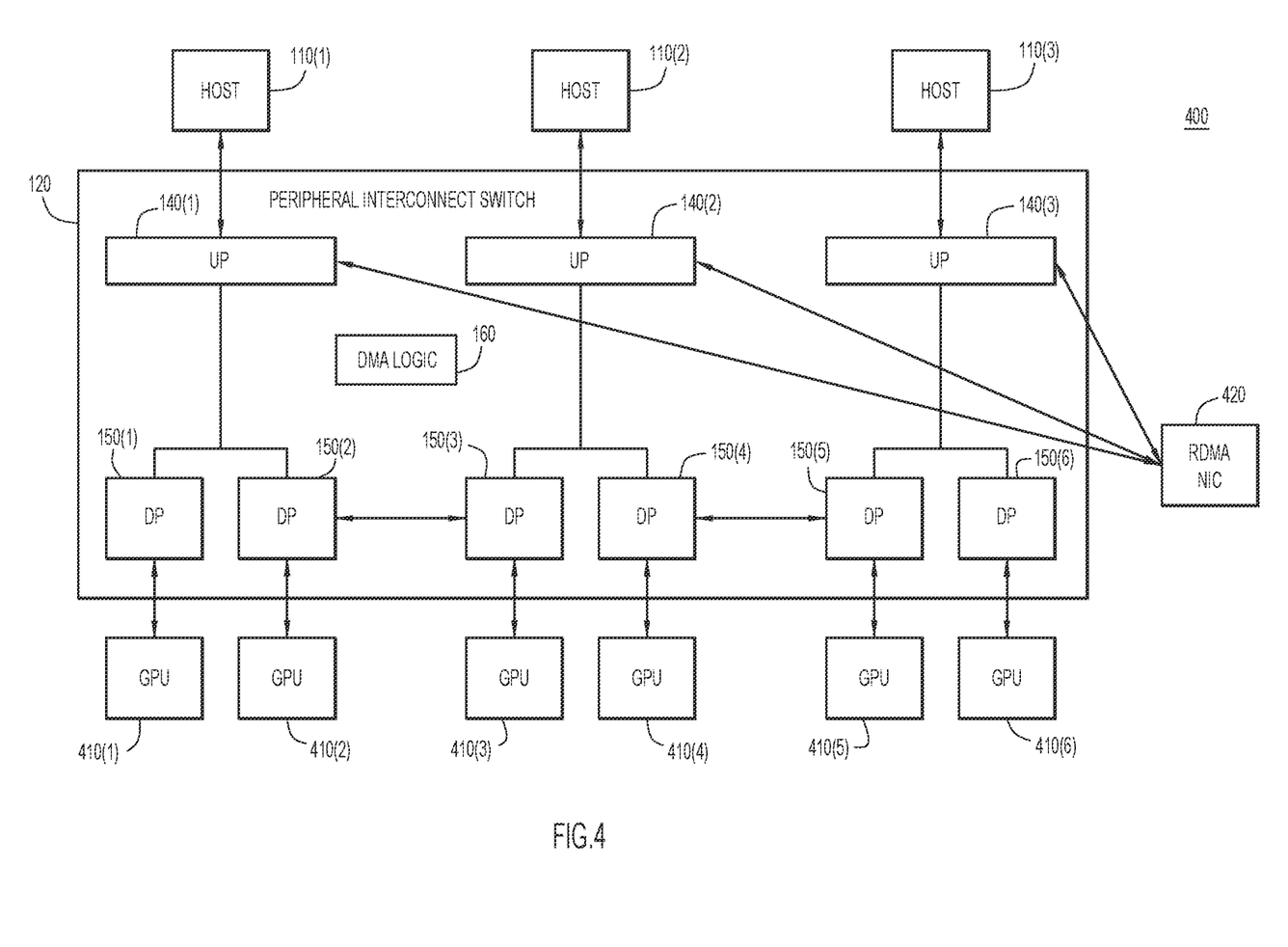
FIG. 4 is a diagram of a system configured to implement a peer direct mechanism for DMA across host devices, according to an example embodiment.

FIG. 4 illustrates another example system 400 configured to implement a peer direct mechanism for DMA across host devices. System 400 includes host devices 110(1)-110(3), peripheral interconnect switch 120, GPUs 410(1)-410(6), and Remote DMA (RDMA) Network Interface Card (NIC) 420. GPUs 410(1)-410(6) are respectively connected to downstream ports 150(1)-150(6). RDMA NIC 420 is connected to each of upstream ports 140(1)-140(3).

Traditionally, GPUs in GPU clusters are often underutilized. Each GPU is mapped to a single host device, and there is a limit on number of transactions that can be generated by a host device for a given GPU since the relevant kernel can only run one application at a time. For example, each host device would typically require a NIC to facilitate high-latency data transfers between GPUs. Initially, a GPU would send data to a first host device (e.g., host device memory/ CPU). Second, the first host device memory would send to the data to a first NIC connected to the host device. Third, the first NIC would send the data to a second NIC connected to a second host device. Fourth, the second NIC would send the data to the second host device (e.g., host device memory/ CPU).

DMA logic 160 enables peripheral interconnect switch 120 to avoid these steps by transferring data directly between one or more of GPUs 410(1)-410(6) and/or RDMA NIC 420. For example, RDMA NIC 420 may be used to communicate with any of GPUs 410(1)-410(6) (say, GPU 410(1)) while bypassing the CPU of host device 110(1), thereby increasing the available bandwidth of host device 110(1). GPUs 410(1)-410(6) may be shared across host devices 110(1)-110(3). From the point of view of host devices 110(1), host device 110(1) may independently control and access GPUs 410(1)-410(6) on demand. For example, GPUs 410(1)-410(6) may be effectively used by an efficient resource sharing algorithm implemented in the NTB driver(s), driver(s) of GPUs 410(1)-410(6), and peripheral interconnect switch 120 management CPU software.

Figure 5:
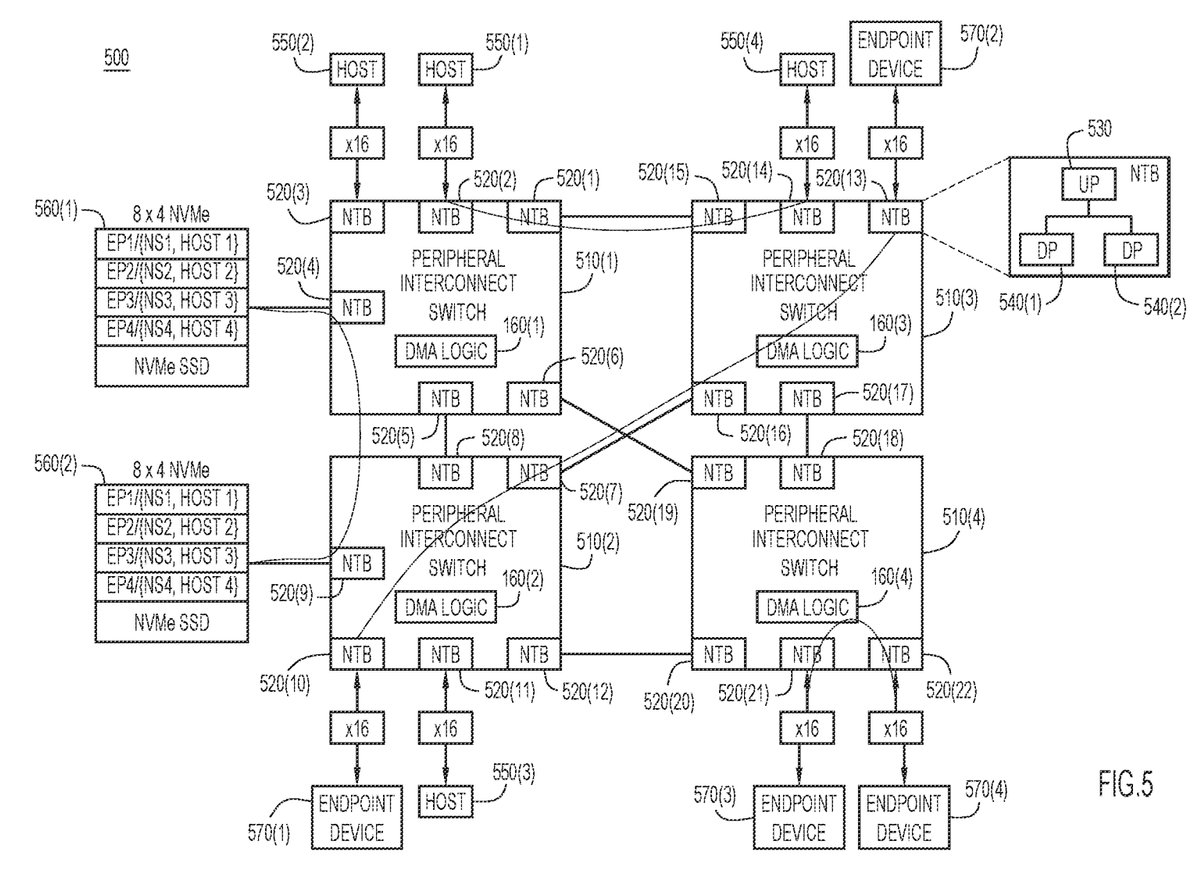
FIG. 5 is a diagram of yet another system configured to implement a peer direct mechanism for DMA across host devices, according to an example embodiment.

FIG. 5 illustrates yet another example system 500 configured to implement a peer direct mechanism for DMA across host devices. System 500 includes peripheral interconnect switches 510(1)-510(4), each respectively including DMA logic 160(1)-160(4). Peripheral interconnect switch 510(1) includes NTBs 520(1)-520(6), peripheral interconnect switch 510(2) includes NTBs 520(7)-520(12), peripheral interconnect switch 510(3) includes NTBs 520(13)-520(17), and peripheral interconnect switch 510(4) includes NTBs 520(18)-520(22). NTBs 520(1)-520(22) may include one or more upstream and/or downstream ports. NTB 520(13), for example, includes upstream port 530 and downstream ports 540(1) and 540(2).

NTB 520(1) is connected to NTB 520(15). NTB 520(2) is connected to host device 550(1), and NTB 520(3) is connected to host device 550(2). NTB 520(4) is connected to NVMe 560(1). NTB 520(5) is connected to NTB 520(8). NTB 520(6) is connected to NTB 520(19). NTB 520(7) is connected to NTB 520(16). NTB 520(9) is connected to NVMe 560(2). NTB 520(10) is connected to endpoint device 570(1). NTB 520(11) is connected to host device 550(3). NTB 520(12) is connected to NTB 520(20). NTB 520(13) is connected to endpoint device 570(2). NTB 520(14) is connected to host device 550(4). NTB 520(17) is connected to NTB 520(18). NTB 520(21) is connected to endpoint device 570(3). NTB 520(22) is connected to endpoint device 570(4). In this example, host devices 550(1)-550(4) may each have a different root complex.

DMA logic 160(1)-160(4) enable peripheral interconnect switches 510(1)-510(4) to perform operations for multiple peer direct mechanisms for DMA across various host devices. In one example, peripheral interconnect switch 510(1) obtains a message from NVMe 560(1) initiating a DMA data transfer between NVMe 560(1) and NVMe 560(2). The message indicates a host-assigned address of NVMe 560(2) as a destination of the message. Based on the host-assigned address of NVMe 560(2), peripheral interconnect switch 510(1) identifies a switch-assigned address of NVMe 560(2). In response to identifying the switch-assigned address of NVMe 560(2), peripheral interconnect switch 510(1) provides the message to peripheral interconnect switch 510(2). Peripheral interconnect switch 510(2) provides the message to NVMe 560(2). Peripheral interconnect switches 510(1)-510(4) may facilitate similar DMA data transfers between host devices 550(1) and 550(4), endpoint devices 570(1) and 570(2), endpoint devices 570(3) and 570(4), etc.

Figure 6:
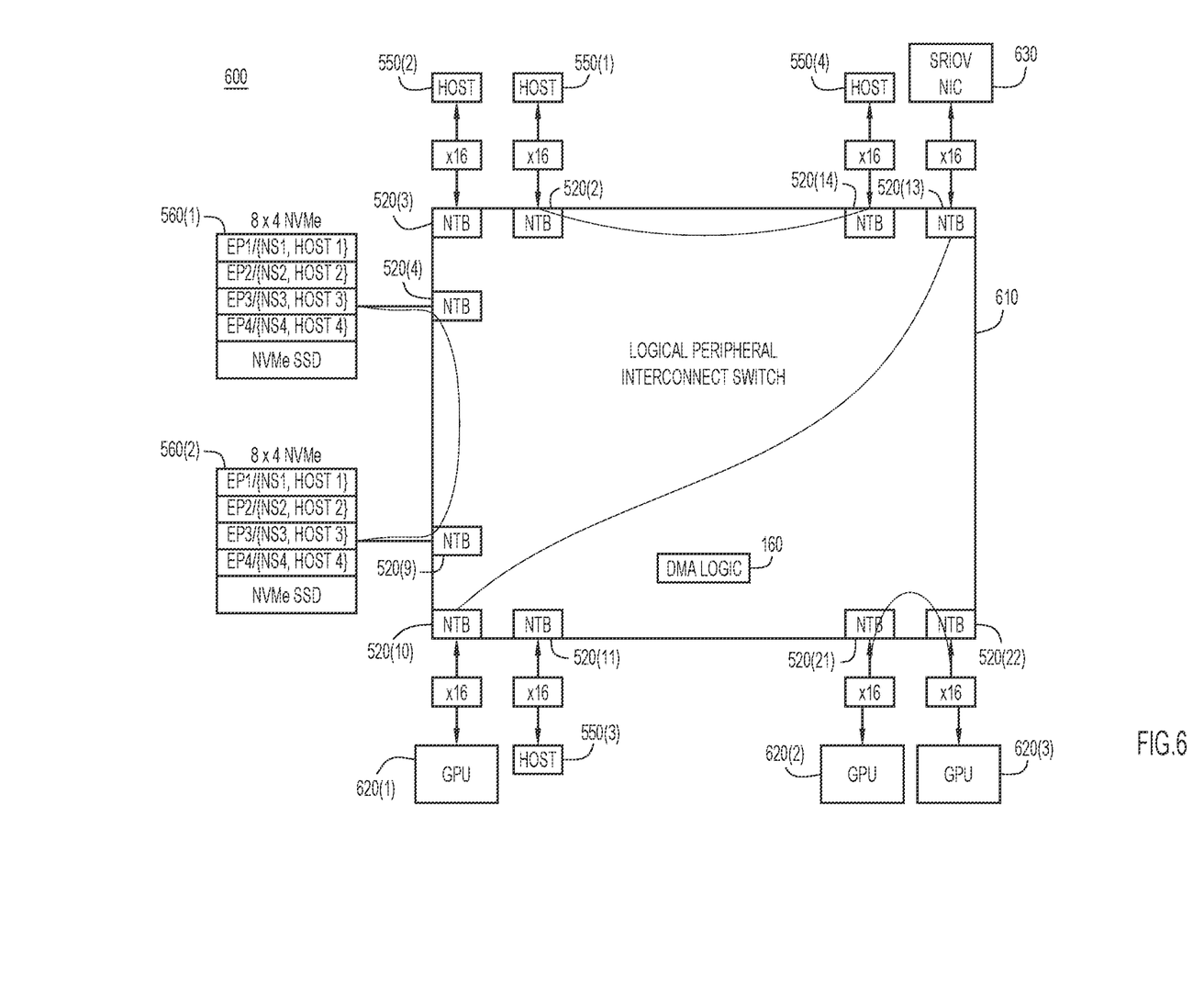
FIG. 6 is diagram illustrating another implementation of a system featuring the peer direct mechanism, according to an example embodiment.

FIG. 6 illustrates another example implementation of a system similar to that of system 500 shown in FIG. 5. System 600 combines peripheral interconnect switches 510(1)-510(4) into a single logical peripheral interconnect switch 610. In this specific example, endpoint devices 570(1), 570(3), and 570(4) are respective GPUs 620(1)-620(3), and endpoint device 570(2) is Single-Root I/O Virtualization (SRIOV) NIC 630. In this example, logical peripheral interconnect switch 610 acts as a single peripheral interconnect switch to enable DMA messages between host devices 550(1) and 550(4); between NVMes 560(1) and 560(2); between GPU 620(1) and SRIOV NIC 630; and between GPUs 620(2) and 620(3).

Figure 7:
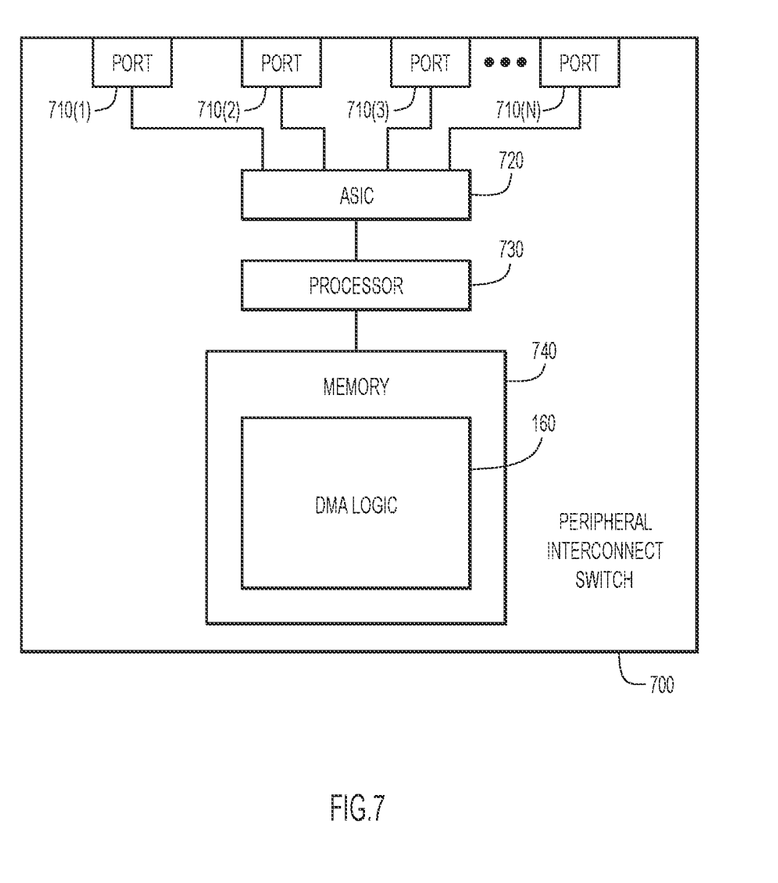
FIG. 7 is a block diagram of a peripheral interconnect switch configured to implement a peer direct mechanism for DMA across host devices, according to an example embodiment.

FIG. 7 is a block diagram of a peripheral interconnect switch 700 configured to implement a peer direct mechanism for DMA across host devices. Reference is made to FIG. 1 for the purpose of describing FIG. 7. Peripheral interconnect switch 700 includes a network/communication interface in the form of a plurality of ports 710(1)-710(N) (e.g., network ports) that enable communications (e.g., over a network). Peripheral interconnect switch 700 further includes ASIC 720 that performs network processing functions, one or more processors 730 (e.g., microprocessors or microcontrollers), and memory 740. Memory 740 includes DMA logic 160.

Memory 740 may include read only memory (ROM), random access memory (RAM), magnetic disk storage media devices, optical storage media devices, flash memory devices, electrical, optical, or other physical/tangible memory storage devices. Thus, in general, memory 740 may comprise one or more tangible (non-transitory) computer readable storage media (e.g., a memory device) encoded with software comprising computer executable instructions and when the software is executed (e.g., by one or more processors 730) it is operable to perform the operations described herein. In particular, as noted, memory 740 includes DMA logic 160 that, when executed, enables peripheral interconnect switch 700 to perform the operations described herein.

Figure 8:
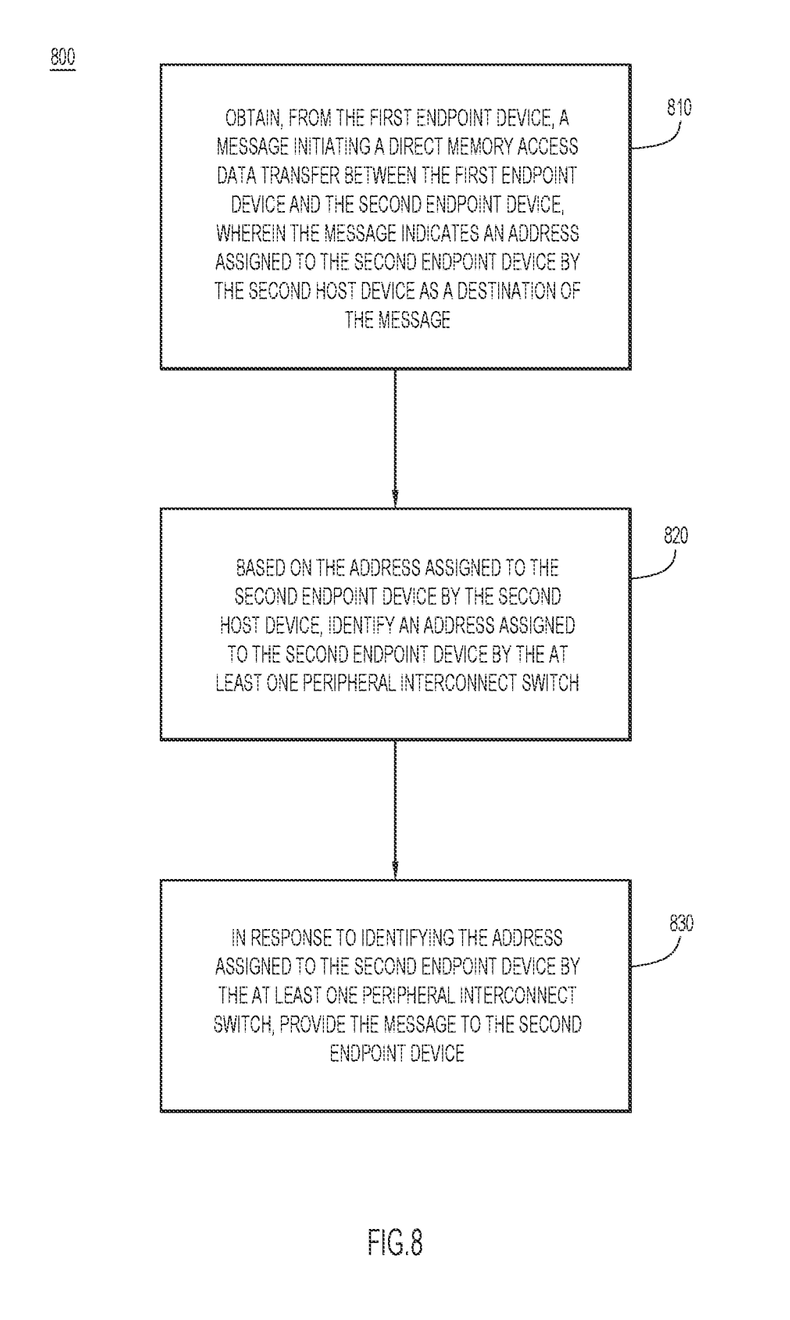
FIG. 8 is a flowchart of a method for implementing a peer direct mechanism for DMA across host devices, according to an example embodiment.

FIG. 8 is a flowchart of an example method 800 for implementing a peer direct mechanism for DMA across host devices. Reference is made to FIG. 1 for the purposes of describing FIG. 8. Method 800 may be performed by at least one peripheral interconnect switch (e.g., peripheral interconnect switch 120) connected to a first host device (e.g., host device 110(1)), a second host device (e.g., host device 110(2)), a first endpoint device (e.g., endpoint device 130(1)), and a second endpoint device (e.g., endpoint device 130(2)). The first host device hosts the first endpoint device and the second host device hosts the second endpoint device.

At 810, the at least one peripheral interconnect switch obtains, from the first endpoint device, a message initiating a direct memory access data transfer between the first endpoint device and the second endpoint device. The message indicates an address assigned to the second endpoint device by the second host device as a destination of the message. At 820, based on the address assigned to the second endpoint device by the second host device, the at least one peripheral interconnect switch identifies an address assigned to the second endpoint device by the at least one peripheral interconnect switch. At 830, in response to identifying the address assigned to the second endpoint device by the at least one peripheral interconnect switch, the at least one peripheral interconnect switch provides the message to the second endpoint device.

Techniques described herein enable a mechanism to efficiently utilize the endpoints between different physical servers. CPU ecosystems have been historically slow to develop, whereas I/O subsystems designed specifically for higher performance and low latency have experienced rapid growth. As such, solutions are provided to bypass the host ecosystem to allow low latency and high throughput between endpoint devices. These solutions also avoid certain restrictions in current approaches, as detailed above, which can lead to underutilization of peer direct mechanisms even in a single-server domain.

Configuration (setup) for techniques described herein may be divided into three stages. The first stage is DMA transaction setup between the device drivers. The second stage is configuration of the address domains and PCIe domains in the switch management CPU and LUTs. The third stage is device resource configuration to refer to the heterogeneous host address domains and PCIe domain(s). Endpoint descriptors exported through the BAR may be configured to refer to another server address domain as referenced by the NTB management CPU. The processing may occur in real time in the data path with assistance from control windows provided by NTB devices and real time software running on the switch management CPU.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: at at least one peripheral interconnect switch connected to a first host device, a second host device, a first endpoint device, and a second endpoint device, wherein the first host device hosts the first endpoint device and the second host device hosts the second endpoint device: obtaining, from the first endpoint device, a message initiating a direct memory access data transfer between the first endpoint device and the second endpoint device, wherein the message indicates an address assigned to the second endpoint device by the second host device as a destination of the message; based on the address assigned to the second endpoint device by the second host device, identifying an address assigned to the second endpoint device by the at least one peripheral interconnect switch; and in response to identifying the address assigned to the second endpoint device by the at least one peripheral interconnect switch, providing the message to the second endpoint device.

In one example, the method further comprises: at the at least one peripheral interconnect switch: obtaining, from the first host device, the address assigned to the second endpoint device by the second host device; and providing, to the first endpoint device, the address assigned to the second endpoint device by the second host device. In a further example, the method comprises: at the at least one peripheral interconnect switch: obtaining, from the second host device, the address assigned to the second endpoint device by the second host device; and providing, to the first host device, the address assigned to the second endpoint device by the second host device. In still a further example, the method comprises: at the at least one peripheral interconnect switch: obtaining, from the first host device, a request to initiate the direct memory access data transfer; and providing the request to the second host device.

In another example, the method further comprises: at the at least one peripheral interconnect switch: obtaining, from the second host device, a command to provide an indication when the direct memory access data transfer is complete; and providing the command to the second endpoint device. In a further example, the method comprises: at the at least one peripheral interconnect switch: obtaining, from the second endpoint device, the indication that the direct memory access data transfer is complete; and providing the indication to the second host device. In still a further example, the method comprises: at the at least one peripheral interconnect switch: obtaining the indication from the second host device; and providing the indication to the first host device.

In yet another example, obtaining the message includes obtaining the message at a first peripheral interconnect switch; identifying the address assigned to the second endpoint device by the at least one peripheral interconnect switch includes identifying the address assigned to the second endpoint device by the at least one peripheral interconnect switch at the first peripheral interconnect switch; and providing the message to the second endpoint device includes: at the first peripheral interconnect switch, providing the message to a second peripheral interconnect switch; and at the second peripheral interconnect switch, providing the message to the second endpoint.

In another form, an apparatus is provided. The apparatus comprises: a communication interface configured to provide or obtain messages to or from a first host device, a second host device, a first endpoint device, and a second endpoint device, wherein the first host device hosts the first endpoint device and the second host device hosts the second endpoint device; and one or more processors coupled to the communication interface, wherein the one or more processors are configured to: obtain, from the first endpoint device, a message initiating a direct memory access data transfer between the first endpoint device and the second endpoint device, wherein the message indicates an address assigned to the second endpoint device by the second host device as a destination of the message; based on the address assigned to the second endpoint device by the second host device, identify an address assigned to the second endpoint device by the apparatus; and in response to identifying the address assigned to the second endpoint device by the apparatus, provide the message to the second endpoint device.

In another form, one or more non-transitory computer readable storage media are provided. The non-transitory computer readable storage media are encoded with instructions that, when executed by a processor of at least one peripheral interconnect switch connected to a first host device, a second host device, a first endpoint device, and a second endpoint device, wherein the first host device hosts the first endpoint device and the second host device hosts the second endpoint device, cause the processor to: obtain, from the first endpoint device, a message initiating a direct memory access data transfer between the first endpoint device and the second endpoint device, wherein the message indicates an address assigned to the second endpoint device by the second host device as a destination of the message; based on the address assigned to the second endpoint device by the second host device, identify an address assigned to the second endpoint device by the at least one peripheral interconnect switch; and in response to identifying the address assigned to the second endpoint device by the at least one peripheral interconnect switch, provide the message to the second endpoint device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at at least one peripheral interconnect switch connected to a first host device, a second host device, a first endpoint device, and a second endpoint device, wherein the first host device hosts the first endpoint device and the second host device hosts the second endpoint device:
   obtaining, from the second host device, a command to provide an indication that a direct memory access data transfer between the first endpoint device and the second endpoint device is complete;
   providing the command to the second endpoint device;
   obtaining, from the first endpoint device, a message initiating a direct memory access data transfer between the first endpoint device and the second endpoint device, wherein the message indicates an address assigned to the second endpoint device by the second host device as a destination of the message;
   performing an address translation between based on the address assigned to the second endpoint device by the second host device, identifying an address assigned to the second endpoint device by the at least one peripheral interconnect switch based on an address mapping;
   in response to identifying the address assigned to the second endpoint device by the at least one peripheral interconnect switch, providing the message to the second endpoint device;
   providing, from the second endpoint device to the second host device, an indication that the direct memory access data transfer is complete; and
   providing, from the second host device to the first host device, the indication that the direct memory access data transfer is complete.

2. The method of claim 1, further comprising:
   at the at least one peripheral interconnect switch:
   obtaining, from the first host device, the address assigned to the second endpoint device by the second host device; and
   providing, to the first endpoint device, the address assigned to the second endpoint device by the second host device.

3. The method of claim 2, further comprising:
at the at least one peripheral interconnect switch:
obtaining, from the second host device, the address assigned to the second endpoint device by the second host device; and
providing, to the first host device, the address assigned to the second endpoint device by the second host device.

4. The method of claim 3, further comprising:
at the at least one peripheral interconnect switch:
obtaining, from the first host device, a request to initiate the direct memory access data transfer; and
providing the request to the second host device.

5. The method of claim 1, wherein:
obtaining the message includes obtaining the message at a first peripheral interconnect switch; and
performing the address translation includes performing the address translation between identifying the address assigned to the second endpoint device by the at least one peripheral interconnect switch includes identifying the address assigned to the second endpoint device by the at least one peripheral interconnect switch based on the address mapping at the first peripheral interconnect switch.

6. An apparatus comprising:
a communication interface configured to provide or obtain messages to or from a first host device, a second host device, a first endpoint device, and a second endpoint device, wherein the first host device hosts the first endpoint device and the second host device hosts the second endpoint device; and
one or more processors coupled to the communication interface, wherein the one or more processors are configured to:
obtain, from the second host device, a command to provide an indication that a direct memory access data transfer between the first endpoint device and the second endpoint device is complete;
provide the command to the second endpoint device;
obtain, from the first endpoint device, a message initiating a direct memory access data transfer between the first endpoint device and the second endpoint device, wherein the message indicates an address assigned to the second endpoint device by the second host device as a destination of the message;
perform an address translation between based on the address assigned to the second endpoint device by the second host device, identify an address assigned to the second endpoint device by the apparatus based on an address mapping;
in response to identifying the address assigned to the second endpoint device by the apparatus, provide the message to the second endpoint device;
provide, from the second endpoint device to the second host device, an indication that the direct memory access data transfer is complete; and
provide, from the second host device to the first host device, the indication that the direct memory access data transfer is complete.

7. The apparatus of claim 6, wherein the one or more processors are further configured to:
obtain, from the first host device, the address assigned to the second endpoint device by the second host device; and
provide, to the first endpoint device, the address assigned to the second endpoint device by the second host device.

8. The apparatus of claim 7, wherein the one or more processors are further configured to:
obtain, from the second host device, the address assigned to the second endpoint device by the second host device; and
provide, to the first host device, the address assigned to the second endpoint device by the second host device.

9. The apparatus of claim 8, wherein the one or more processors are further configured to:
obtain, from the first host device, a request to initiate the direct memory access data transfer; and
provide the request to the second host device.

10. One or more non-transitory computer readable storage media encoded with instructions that, when executed by a processor of at least one peripheral interconnect switch connected to a first host device, a second host device, a first endpoint device, and a second endpoint device, wherein the first host device hosts the first endpoint device and the second host device hosts the second endpoint device, cause the processor to:
obtain, from the second host device, a command to provide an indication that a direct memory access data transfer between the first endpoint device and the second endpoint device is complete;
provide the command to the second endpoint device;
obtain, from the first endpoint device, a message initiating a direct memory access data transfer between the first endpoint device and the second endpoint device, wherein the message indicates an address assigned to the second endpoint device by the second host device as a destination of the message;
perform an address translation between based on the address assigned to the second endpoint device by the second host device, identify an address assigned to the second endpoint device by the at least one peripheral interconnect switch based on an address mapping;
in response to identifying the address assigned to the second endpoint device by the at least one peripheral interconnect switch, provide the message to the second endpoint device;
provide, from the second endpoint device to the second host device, an indication that the direct memory access data transfer is complete; and
provide, from the second host device to the first host device, the indication that the direct memory access data transfer is complete.

11. The one or more non-transitory computer readable storage media of claim 10, wherein the instructions further cause the processor to:
obtain, from the first host device, the address assigned to the second endpoint device by the second host device; and
provide, to the first endpoint device, the address assigned to the second endpoint device by the second host device.

12. The one or more non-transitory computer readable storage media of claim 11, wherein the instructions further cause the processor to:
obtain, from the second host device, the address assigned to the second endpoint device by the second host device; and
provide, to the first host device, the address assigned to the second endpoint device by the second host device.

13. The one or more non-transitory computer readable storage media of claim 12, wherein the instructions further cause the processor to:

obtain, from the first host device, a request to initiate the direct memory access data transfer; and provide the request to the second host device.

14. The method of claim 5, wherein providing the message to the second endpoint device includes:
   at the first peripheral interconnect switch, providing the message to a second peripheral interconnect switch; and
   at the second peripheral interconnect switch, providing the message to the second endpoint device.

15. The method of claim 1, further comprising:
   obtaining, from the second host device, a command to provide the indication that the direct memory access data transfer is complete.

16. The method of claim 15, further comprising:
   providing the command to the second endpoint device.

17. The apparatus of claim 6, wherein the one or more processors are further configured to:
   obtain, from the second host device, a command to provide the indication that the direct memory access data transfer is complete.

18. The apparatus of claim 17, wherein the one or more processors are further configured to:
   provide the command to the second endpoint device.

19. The one or more non-transitory computer readable storage media of claim 10, wherein the instructions further cause the processor to:
   obtain, from the second host device, a command to provide the indication that the direct memory access data transfer is complete.

20. The one or more non-transitory computer readable storage media of claim 19, wherein the instructions further cause the processor to:
   provide the command to the second endpoint device.

* * * * *